Nov. 28, 1950     M. GLICK     2,532,061

FISHING GUIDE

Filed March 25, 1946

INVENTOR
M. GLICK

By J.H.G. Cool
ATTORNEY

Patented Nov. 28, 1950

2,532,061

UNITED STATES PATENT OFFICE 2,532,061

FISHING GUIDE

Murry Glick, St. Louis, Mo.

Application March 25, 1946, Serial No. 656,909

1 Claim. (Cl. 35—74)

My invention relates to a new and useful improvement in fishing guides, and has for its principal object to provide a relatively simple device that is easy to manipulate and is also inexpensive to make. Another object is to so construct my fishing guide that it is small and compact and can easily be carried in a pocket or billfold.

Still another object is to provide a series of revoluble dials having indicia thereon whereby a series of numbers will appear when said dials are rotated in accordance with observable data and a calendar date arranged according to phases of the moon, whereby upon the addition of said numbers and reference to a scale carried upon a surface of said guide the fishing guide will indicate whether fishing should be undertaken or not, and the person using said guide can generally know whether he should undertake the fishing trip or not.

I prefer to make my fishing guide flat and preferably with the indicia on the dials observable on one face thereof and the instructions and the scale to be used, when the numbers appearing on the said dials have been combined, on the opposite face.

Figure 1:
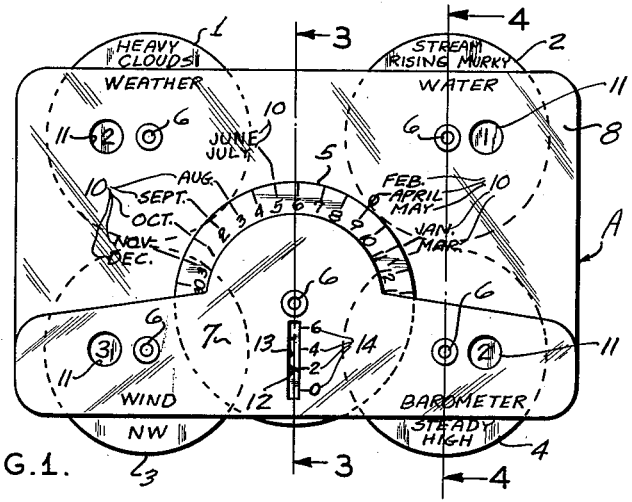
Fig. 1 is a face view of my fishing guide.

In my observations of factors which may influence the catching of fish in our streams it seems that weather, wind, barometer, stream conditions, and the phase of the moon are important, and when used as a guide it has been my experience that in a large majority of times the success of the fishing trip may be quite certainly assured. I have created a small, flat, and compact structure which can be conveniently carried in a pocket or billfold and can be quickly and conveniently manipulated to tell from observable data whether one can expect favorable or unfavorable fishing results.

In the drawings:

A mounting A is provided with a series of revoluble dials as follows: 1 designates the dial in the upper left-hand portion (Fig. 1) of the mounting A and relates to the condition of the weather as apparent to the observer. 2 designates the dial in the upper right-hand portion (Fig. 1) of the mounting A and relates to the condition of the water of the stream to be fished. 3 designates the dial in the lower left-hand portion (Fig. 1) of the mounting A and relates to the direction of the wind. 4 designates the dial in the lower right-portion (Fig. 1) of the mounting A and relates to the barometer reading. 5 designates the dial at the lower center of the mounting A (Fig. 1) and relates to the dates of the month and phases of the moon. The dials 1 to 5 are revolubly mounted in the mounting A, as at 6.

Figures 3, 4:
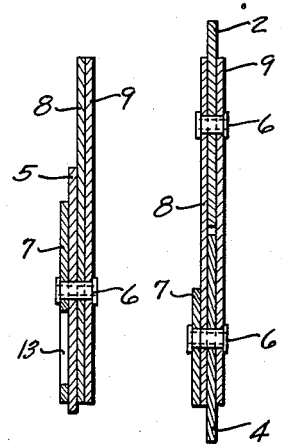
Fig. 3 is a view taken on line 3—3, Fig. 1.
Fig. 4 is a view taken on line 4—4, Fig. 1.
Figure 2:
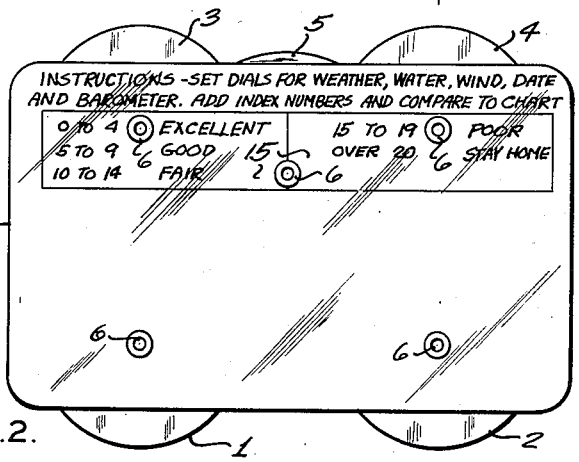
Fig. 2 is the opposite face view of my guide to that shown in Fig. 1.
Figure 5:
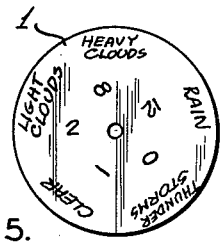
Fig. 5 is the dial having indicia thereon relating to weather and with a series of numerals thereon.
Figure 6:
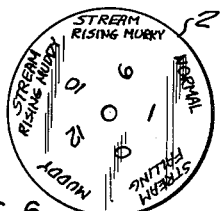
Fig. 6 is the dial having indicia thereon relating to water and also with a series of numerals thereon.
Figure 9:
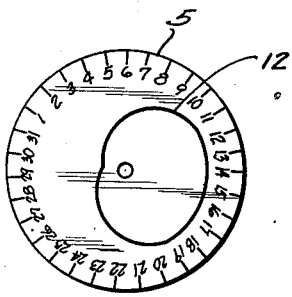
Fig. 9 is the dial having the numerals 1 to 31 thereon and relates to the calendar arranged according to the appearance of the new moon in each month.
Figure 7:
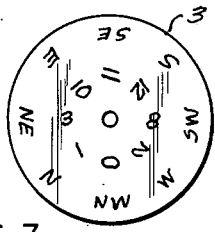
Fig. 7 is the dial having indicia thereon relating to wind and also with a series of numerals thereon.
Figure 8:
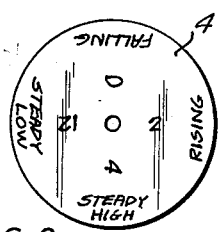
Fig. 8 is the dial having indicia thereon relating to barometer and also with a series of numerals thereon.

The mounting A is formed of a face member 7 of a configuration clearly shown in Fig. 1, a flat member 8, and a flat member 9, all clearly shown in side cross-sectional elevation in Figs. 3 and 4.

The indicia 10 on the flat member 8 is an arrangement of the twelve months of the year arranged around the upper half of the dial 5 according to the date of the new moon for each month, and the months have index lines associated therewith so that when the dial 5 is rotated one of the indicia 10 can be alined with the index line for the desired day of the month depicted on the outer edge of dial 5. This arrangement, as shown in Fig. 1, is calculated for the year 1946. The guide as to the arrangement of the months and to the date of the new moon in each month must be changed each year, because each new year will bring about a necessary change in the location of the days of the month on date dial 5. The days of the new moon are ascertainable from an ordinary calendar, and the months having the same date for the new moon are grouped together on the flat member 8. An index line is positioned so that it leads from said grouped months to the periphery of dial 5, so that when said dial is rotated the date for the new moon in said grouped months may be positioned opposite said index line.

It will be noted in Fig. 1 that a portion of each of dials 1 to 5 projects beyond the upper and lower edges of the mounting A, so that said dials may be easily rotated. Also, the mounting A is provided with circular apertures 11 through which the numerals on the dials 1 to 4 may be seen.

On dial 5 there appears a curved line 12 which is observable through a vertical slot 13 in the face member 7, and is adapted to be used with a numerical scale 14, showing the numerals 0, 2, 4, and 6, and to indicate which of said numerals is to be used when adding up the different numbers on the face of member 8 to be employed in using the chart 15 on the back of the member 9. In calibrating the month indicia 10 with respect to the periphery of dial 5, said dial is first positioned so as to read 0 on scale 14 and as thus fixed the month indicia are then located with respect to the dial such that their indices coincide with that number on the dial which corresponds to the day in that month on which a new moon occurs.

Instructions for using my fishing guide appear on the back of the member 9, just above the chart 15.

I claim:

A fishing guide comprising a pair of flat members rigidly secured together and a plurality of disks mounted on independent axes and rotatably positioned between said flat members and having indicia thereon adjacent their peripheries relative to the weather, to the state of the stream to be fished, to the wind, and to the barometer, respectively, and having respective, correlatively positioned numerals thereon adapted to be observed through apertures in one of said flat members when said indicia are exposed adjacent the peripheral edge of said one of said flat members as a reading line, a radially slotted and apertured member rigidly secured to said flat members and having an arcuate portion, a disk rotatably secured between said slotted member and said one of the flat members and having the numbers 1 to 31, inclusive, thereon arranged adjacent its periphery so as to be observable around said arcuate portion, the names of the months of the year being arranged in a particular manner on said one of the flat members and provided with indicia for registry with said numbers, numerals adjacent the slot of said radially slotted member, a polar curve outlining an eccentrically shaped figure on said last-named rotatable disk for association with said numerals.

MURRY GLICK.

REFERENCES CITED

The following references are of record in the file of this patent:

UNITED STATES PATENTS

| Number | Name | Date |
|---|---|---|
| 1,350,303 | Elvyn | Aug. 24, 1920 |
| 1,438,144 | Stevenson | Dec. 5, 1922 |
| 1,448,293 | Gulline | Mar. 13, 1923 |
| 1,525,696 | Spencer | Feb. 10, 1925 |
| 1,578,374 | Schultz | Mar. 30, 1926 |
| 1,810,153 | Aker | June 16, 1931 |
| 2,042,615 | Maxson | June 2, 1936 |
| 2,098,933 | Hathaway | Nov. 9, 1937 |
| 2,234,896 | DeTurk | Mar. 11, 1941 |
| 2,385,732 | Redding | Sept. 25, 1945 |